(12) United States Patent
Hino et al.

(10) Patent No.: US 7,559,612 B2
(45) Date of Patent: Jul. 14, 2009

(54) INTERNALLY GEARED BICYCLE HUB AND COVER THEREFOR

(75) Inventors: Tetsuya Hino, Sakai (JP); Minoru Ito, Sakai (JP)

(73) Assignee: Shimano Inc., Osaka (JP)

( * ) Notice: Subject to any disclaimer, the term of this patent is extended or adjusted under 35 U.S.C. 154(b) by 366 days.

(21) Appl. No.: 11/345,226

(22) Filed: Feb. 2, 2006

(65) Prior Publication Data
US 2006/0191760 A1    Aug. 31, 2006

(30) Foreign Application Priority Data
Feb. 28, 2005    (EP) .................................. 05004349

(51) Int. Cl.
*B60B 27/02*    (2006.01)
(52) U.S. Cl. .................................. 301/110.5
(58) Field of Classification Search .................. 301/59, 301/110.5, 110.6, 124.2, 37.41
See application file for complete search history.

(56) References Cited

U.S. PATENT DOCUMENTS

| | | | | | |
|---|---|---|---|---|---|
| 4,567,973 | A | * | 2/1986 | Butz | .......................... 192/64 |
| 5,531,510 | A | * | 7/1996 | Yamane | ..................... 301/110.5 |
| 5,997,104 | A | * | 12/1999 | Campagnolo | ............ 301/110.5 |
| 6,030,052 | A | * | 2/2000 | Watarai et al. | ............ 301/110.5 |
| 6,068,349 | A | * | 5/2000 | Henderson et al. | ............. 301/61 |
| 6,322,155 | B1 | | 11/2001 | Chen | |
| 6,325,386 | B1 | | 12/2001 | Shoge | |
| 6,401,895 | B1 | * | 6/2002 | Chen | .......................... 192/64 |
| 6,572,508 | B2 | | 6/2003 | Shoge | |
| 6,607,465 | B1 | | 8/2003 | Shoge | |
| 6,641,500 | B2 | | 11/2003 | Shoge | |
| 7,029,075 | B2 | * | 4/2006 | Kuan et al. | ............... 301/110.5 |
| 7,166,054 | B2 | * | 1/2007 | Urabe | ......................... 475/297 |
| 7,431,405 | B2 | * | 10/2008 | Urabe | ..................... 301/110.5 |
| 7,461,904 | B2 | * | 12/2008 | Kanehisa et al. | ......... 301/110.5 |
| 7,478,885 | B2 | * | 1/2009 | Urabe | ..................... 301/110.5 |
| 2002/0008422 | A1 | * | 1/2002 | Tabe | ........................ 301/110.5 |

FOREIGN PATENT DOCUMENTS

| | | |
|---|---|---|
| DE | 20101377 U1 | 3/2001 |
| EP | 1040993 A2 | 4/2000 |

* cited by examiner

*Primary Examiner*—Russell D Stormer
(74) *Attorney, Agent, or Firm*—Global IP Counselors, LLP (57) ABSTRACT

An internally geared bicycle hub cover is provided to cover an end of internally geared bicycle hub. The cover has a generally cup-shaped annular housing, an inner annular seal and an outer annular seal. The generally cup-shaped annular housing includes a base portion defining a centrally located driving member opening and an outer rim portion located radially outward of the base portion with at least two radially projecting protuberances configured and arranged to engage a cover mating structure on an internally geared bicycle hub. The inner annular seal is disposed on the base portion of the annular housing about the driving member opening. The outer annular seal is disposed on the outer rim portion of the annular housing face in a substantially opposite radial direction from the radially projecting protuberances. The outer annular seal is provided on the annular housing to wedge the protuberances into a corresponding annular groove or notches on the hub transmission/shell.

16 Claims, 5 Drawing Sheets

FIG. 9

INTERNALLY GEARED BICYCLE HUB AND COVER THEREFOR

CROSS-REFERENCE TO RELATED APPLICATIONS

This application claims priority under 35 U.S.C. § 119 to European Patent Application No. 05 00 4349.6. The entire disclosure of European Patent Application No. 05 00 4349.6 is hereby incorporated herein by reference.

BACKGROUND OF THE INVENTION

1. Field of the Invention

This invention generally relates to an internal hub transmission for a bicycle. More specifically, the present invention relates to an internal hub transmission which uses a sealing assembly that rotates with the hub shell.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Some bicycles are equipped with a transmission for making riding up and down hills easier. One type of bicycle transmission component is an internal hub transmission. The internal hub transmission has been extensively redesigned over the years.

Bicycles, particularly recreational bicycles referred to as city cruisers, are inexpensive and are easy to ride, and are thus widely used to commute to work or school or for shopping. With this type of recreational bicycle, an internal hub transmission is sometimes mounted at the rear wheel in order to ride at high speeds over flat terrain or to ride uphill with minimal exertion.

An internal hub transmission generally comprises a hub axle that is fixed to the bicycle frame; a hub shell that is able to rotate around the hub axle; a driving member for receiving a driving force from the drive chain; a planet gear mechanism that is housed in the hub shell for transmitting the driving force from the driving member to the hub shell through a plurality of transmission paths; and a clutch mechanism for selecting among the plurality of transmission paths. The clutch mechanism has a clutch member for switching the drive transmission path by moving in the direction of the hub axis, and a push rod that presses the clutch member.

Because the driving member and hub shell are capable of rotation relative to each other, there is a space between the two which creates a risk that water, dirt and other contaminants may enter the inside of the hub shell and adversely affect the operation of the planet gear mechanism and other components. Some internal hub transmissions use a labyrinth-type sealing mechanism to inhibit entry of contaminants into the hub shell. However, since such a system relies on staggered barrier walls with spaces between the barrier walls, there is still a risk that contaminants can migrate between the barrier walls and enter the inside of the hub shell, especially if the hub is immersed in water. Other internal transmission hubs use a rubber seal mounted to an inner peripheral surface of an annular metal ring, which, in turn, is press-fit onto the inner peripheral surface of the hub shell. While such a sealing mechanism is effective, the rubber seal inevitably becomes worn as a result of the sliding contact with the driving member as the hub rotates relative to the driving member. Because the annular ring containing the rubber seal is press-fit onto the inner peripheral surface of the hub shell, removal of the old seal and installation of a new seal is very difficult. Finally, there are covers for a bicycle transmission including an annular housing and an annular seal member, wherein the housing includes a side wall that defines a plurality of circumferentially disposed slots, and the seal member is retained within the housing and extends radially inwardly, and wherein the seal member is formed from a resilient material, and the housing is formed from a material that is more rigid than the seal member. Such an arrangement allows easy removal and replacement of the cover, and can for example be taken from European Patent Application No. 1040993.

Experience has shown, however, that even with the latter mentioned type of seal for a bicycle hub transmission, entry of contaminants into the hub can only be prevented in part, with dust particles still able to make their way through the various interfaces between the seal and the relevant parts of the hub transmission. Accordingly, there is a need for further enhancement of this type of seal to obtain a more reliable and effective sealing of the hub transmission from contaminants. In view of the above, it will be apparent to those skilled in the art from this disclosure that there exists a need for an improved internal hub transmission. This invention addresses this need in the art as well as other needs, which will become apparent to those skilled in the art from this disclosure.

SUMMARY OF THE INVENTION

One object of the present invention is to provide a cover being used on an internally geared bicycle hub that effectively prohibits contaminants from entering the inside of the hub transmission, so that a reliable function of the hub transmission can be maintained over a long period of time.

Another object of the present invention is to provide an internally geared hub cover that is easy to apply and remove.

The foregoing objects can basically be attained by providing a hub cover for an internally geared bicycle hub cover that basically comprises a generally cup-shaped annular housing, an inner annular seal and an outer annular seal. The generally cup-shaped annular housing includes a base portion defining a centrally located driving member opening and an outer rim portion located radially outward of the base portion with at least two radially projecting protuberances configured and arranged to engage a cover mating structure on an internally geared bicycle hub. The inner annular seal is disposed on the base portion of the annular housing about the driving member opening. The outer annular seal is disposed on the outer rim portion of the annular housing face in a substantially opposite radial direction from the radially projecting protuberances.

By these features as provided according to the invention, the internally geared hub cover can be provided such that it effectively prohibits contaminants from entering the hub transmission. The outer portion of the cover, besides coming into engagement with corresponding means on the hub transmission to removably hold it in place, is wedged tightly into the corresponding annular groove or openings on the hub transmission so that contaminants can be kept from working its way through the engagement portions of the cover and the hub transmission, respectively. By providing a reinforcement element in the inner annular seal retained on the central opening, a reliable, yet still elastic abutment of the seal against the corresponding contact surface of the respective part of the hub transmission can be guaranteed, so that entry of contaminants at this point can be effectively prohibited too. Furthermore, by providing the annular seal on the outer circumferential surface of the internally geared hub cover, the inner protuberances at the rim of the internally geared hub cover can be kept very small, as engagement with corresponding openings in the respective parts of the hub transmission is guaranteed by the annular seal on the outer circumferential surface of the cover, forcing the protuberances into the openings.

In a more specific embodiment of the hub transmission cover, the bottom of the internally geared hub cover extends slightly over the circumferential wall of the cover, so that through the intersection of the a circumferential seat is formed for receiving the separate, circumferential seal and keep it in a defined position with respect to the internally geared hub cover.

Furthermore, the edge of the central opening in the bottom of the internally geared hub cover can be provided with a circumferential flange forming a seat to receive the separate seal and thus provide it with a torque barrier, to keep the seal retained on the edge of the central opening from flexing away from its contact surface on the hub transmission under pressure and maintain the close contact required for an effective sealing.

When the hub transmission cover is applied to a bicycle hub, the bicycle hub includes a hub shell, which can be made of one integral piece or several functional pieces combined with each other, capable of rotating around a hub axis. The bicycle hub further includes an inner member is disposed coaxially with the hub shell, and a transmission for communicating a driving force to the hub shell through a plurality of transmission paths. The hub shell can have at least one of a circumferential hub coupling projection, a substantially radially extending circumferential hub coupling groove, and a wedging groove extending perpendicularly to the coupling groove. The coupling groove is formed in one of the inner side walls of the wedging groove. The hub coupling groove can have the form of distinct and circumferentially distributed openings with which the protuberances of the cover come into engagement. The circumferential wall of the cover has a cross section at least partially corresponding with that of the circumferential hub coupling projection to keep the cover in place.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
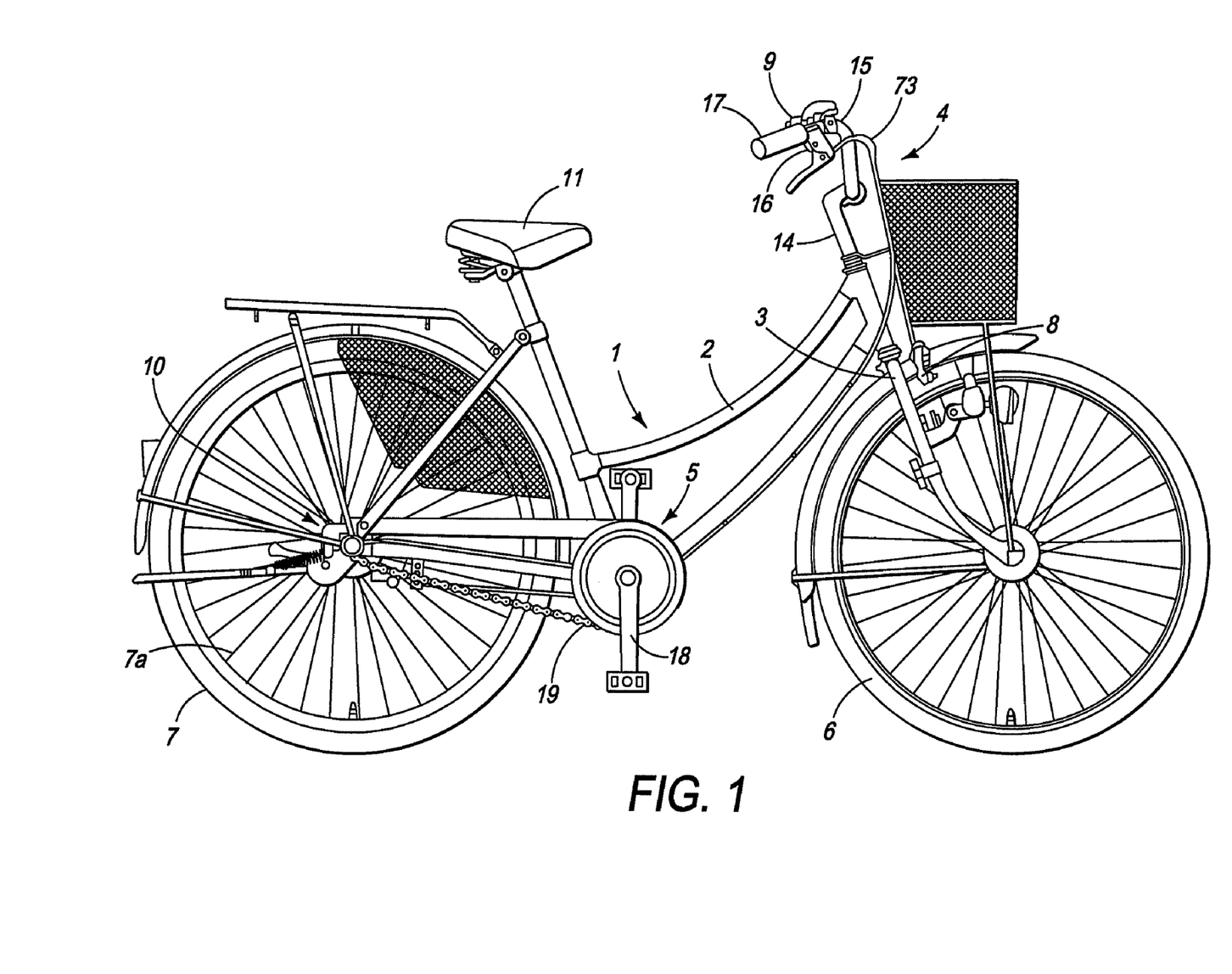
FIG. 1 is a side elevational view of a bicycle that incorporates an internally geared hub with an internally geared hub cover in accordance with one embodiment of the present invention.

Referring initially to FIG. 1, a side elevational view of a bicycle is illustrated that is equipped with a first embodiment of the present invention. This bicycle is a recreational bicycle which comprises a frame 1 with a double-loop type of frame body 2 and a front fork 3. The bicycle further comprises a handle component 4, a drive component 5, a front wheel 6, a rear wheel 7, a front braking apparatus 8, a gear shifter component 9 for operating an internally geared hub 10 mounted to the rear wheel 7, and a saddle 11.

The handle component 4 has a handle stem 14 fixed to the upper portion of the front fork 3 and a handlebar 15 fixed to handle stem 14. The front brake apparatus 8 has a brake lever 16 that is mounted at the right end of the handlebar 15. Also a grip 17 and the gear shifter component 9 are mounted at the right end of the handlebar 15. The gear shifter component 9 is mounted on the brake lever 16 on the inside of the brake lever 16, and it is linked with the internally geared hub 10 by a shift control cable comprising an inner cable and an outer casing formed by a spiral outer cable. The gear shifter component 9 has an ordinary structure having a winding lever for winding the inner cable and a release lever that releases the winding operation of the winding lever and plays out the inner cable, and as such it will not be described in detail herein. The drive component 5 has a gear crank 18 that is provided to the lower portion (bottom bracket portion) of the frame body 2, a chain 19 that goes around the gear crank 18, and the internally geared hub 10.

Figure 2:
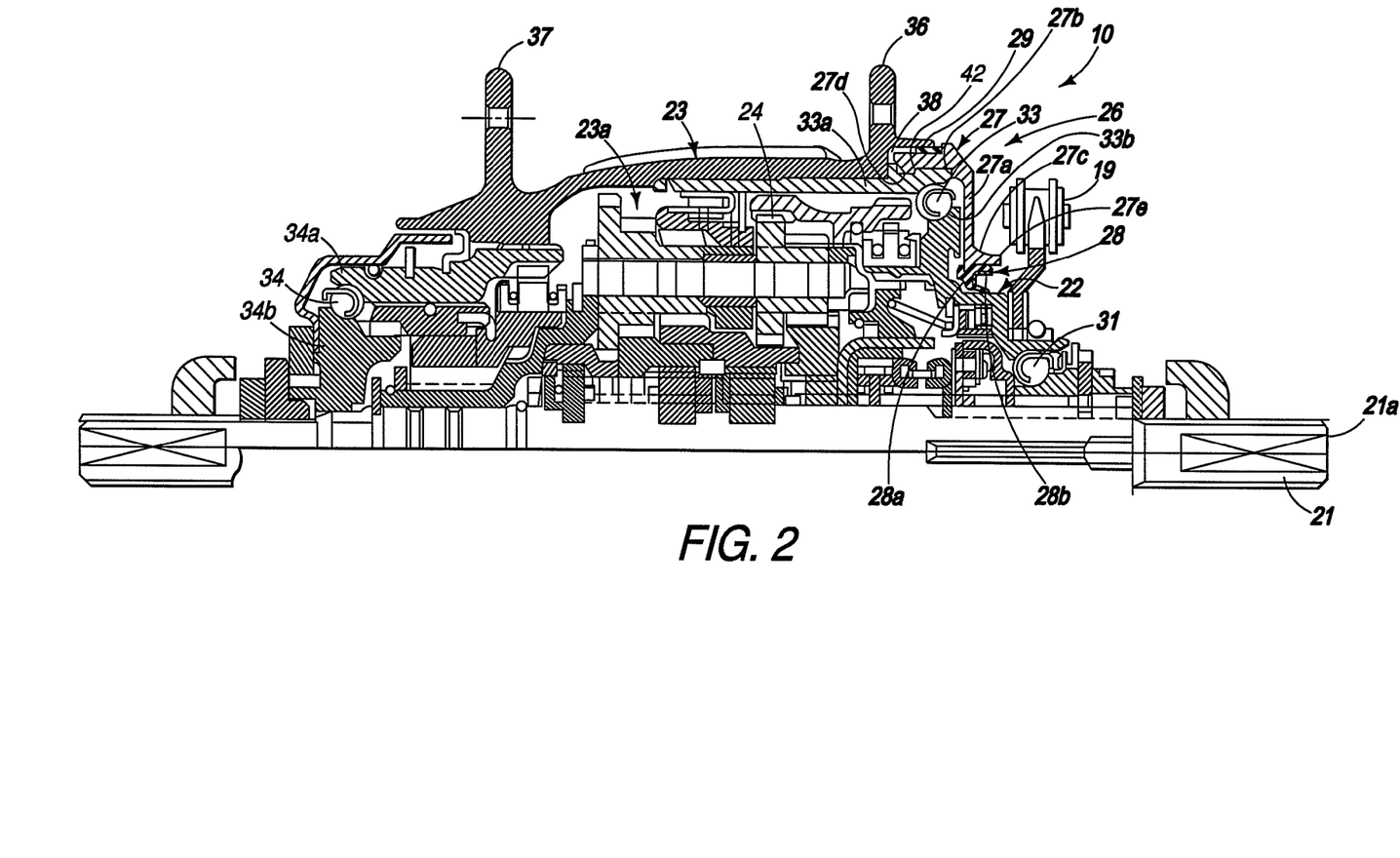
FIG. 2 is a partial cross sectional view of the internally geared hub and the internally geared hub cover in accordance with the present invention.

As shown in FIG. 2, the internally geared hub 10 basically includes a hub axle 21, a driving member 22, a hub shell 23, a hub transmission 24 and an internally geared hub cover 26. The hub transmission in the preferred embodiment is a planet gear mechanism. The hub axle 21 is fixed to a rear dropout of the frame body 2 of the bicycle. The driving member 22 is disposed around the outer periphery at one end of the hub axle 21. The hub shell 23 is disposed further around the outer periphery of the hub axle 21 and the driving member 22. The hub transmission 24 is operatively coupled between the driving member 22 and the hub shell 23.

The cover 26 disposed on the right side of internally geared bicycle hub 10. The cover 26 includes a generally cup-shaped annular housing 27, an inner annular seal 28, and an outer annular seal 29. The inner annular seal member 28 is configured and arranged to contact a portion of the hub transmission 24 projecting through the cover 26. The outer annular seal 29 is configured and arranged to contact an inner wall of the hub shell 23.

Figure 3:
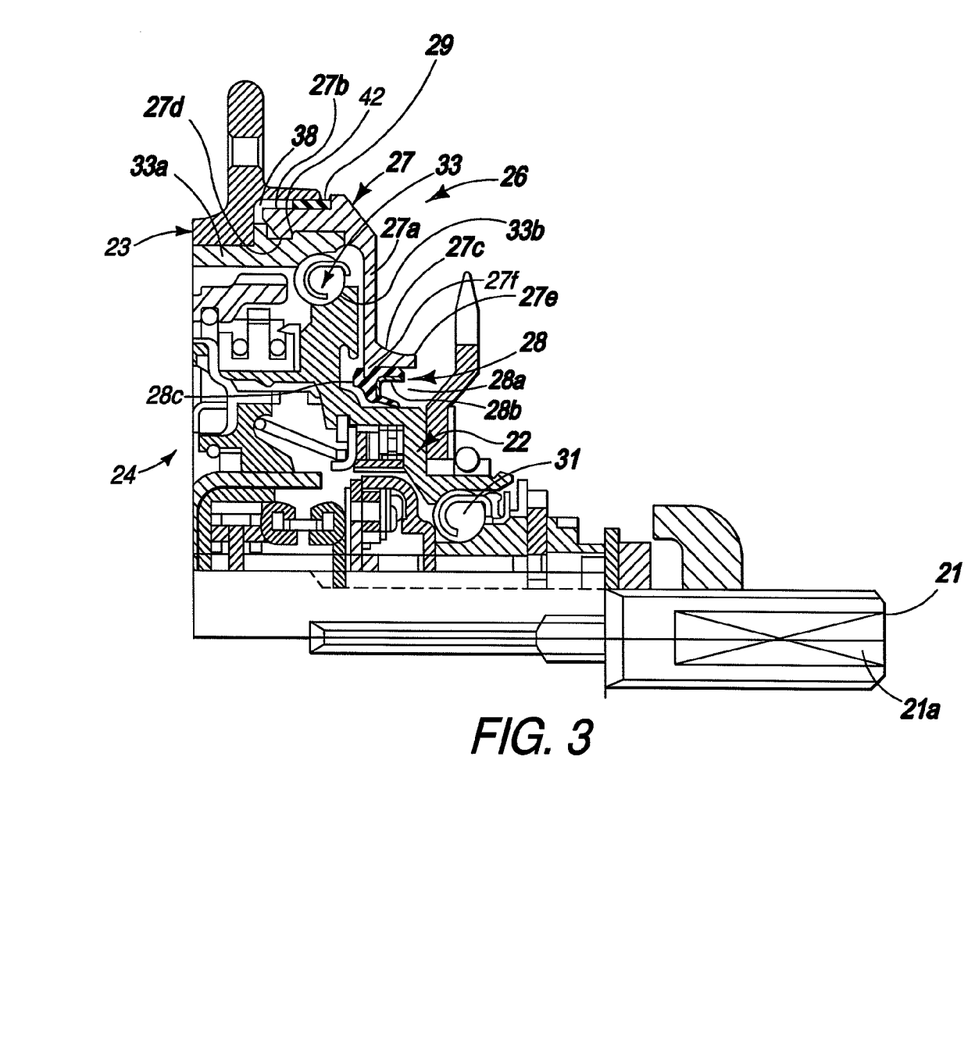
FIG. 3 is an enlarged partial cross sectional view of the internally geared hub and the internally geared hub cover illustrated in FIG. 2.
Figure 6:
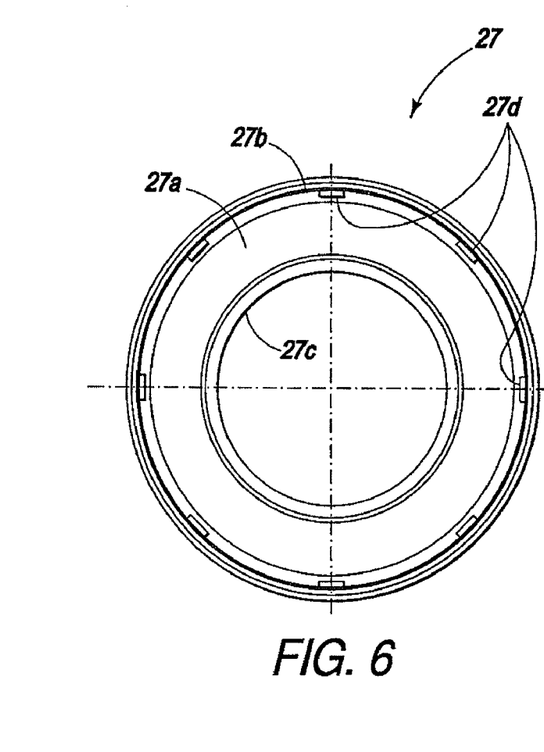
FIG. 6 is an inside elevational view of the internally geared hub cover illustrated in FIG. 2 without the inner seal.

As shown in FIGS. 2 and 3, the generally cup-shaped annular housing 27 basically including an annular base portion 27a and an annular outer rim portion 27b. The annular base portion 27a is ring shaped and defines a centrally located driving member opening 27c. The outer rim portion 27b is located radially outward of the base portion 27a with at least one radially projecting protuberance 27d and more preferably a plurality (eight) of the radially projecting protuberances 27d as shown in FIG. 6. When several of the radially projecting protuberances 27d are used, as shown, the radially projecting protuberances 27d are equally spaced apart in the circumferential direction. The projecting protuberances 27d are configured and arranged to engage a cover mating structure on the internally geared bicycle hub 10 as discussed below.

As shown in FIGS. 2 and 3, the hub axle 21 is a rod-like member which has a larger outer diameter in its middle and a smaller outer diameter at both ends. Threads are formed at both ends of hub axle 21. An operation hole 21a is formed in the axial portion of the hub axle 21 from the right end to the center in FIG. 2.

One end of the driving member 22 is rotatably supported on the hub axle 21 via a bearing assembly 31 that includes a plurality of balls disposed between an annular hub cone and an annular hub cup. The hub shell 23 includes a tubular outer part forming a housing space 23a around the inner periphery thereof that houses the driving member 22 and the hub transmission 24. The hub shell 23 is configured and arranged to rotate around the hub axle 21 via a pair of bearing assemblies 33 and 34. the bearing assemblies 33 and 34 have outer bearing cups 33a and 34a, respectively, that are fixed to the hub shell 23 and inner bearing cups 33b and 34b, respectively, that are fixed to the hub shell 23 fixed to the hub transmission 24. Thus, the bearing assemblies 33 and 34 can be considered part of either the hub shell 23 or the hub transmission 24. The hub shell 23 has a pair of integrally formed flanges 36 and 37 for supporting spokes 7a (see FIG. 1). The flanges 36 and 37 are fixed at both ends of the outer periphery of the hub shell 23.

The inner annular seal member 28 is configured and arranged to contact a portion of the hub transmission 24 that projects through the driving member opening 27c. The outer annular seal 29 is configured and arranged to contact an inner wall of an annular groove 38 formed between the hub shell 23 and an outer part of the hub transmission 24.

The radially projecting protuberances 27d can be considered as wedging protuberances that engage an annular groove 42 in the outer part of the outer bearing cup 33a, which can be considered part of either the hub shell 23 or the hub transmission 24. As can be taken in particular from FIG. 3, due to the outer annular seal 29, the radial extent of each of the protuberances 27d can be kept minimal. Thus, application and removal of the internally geared hub cover 26 is extremely easy, while a tight and reliable fit of the internally geared hub cover 26 can be guaranteed at the same time keeping contaminants from entering the inside of the hub transmission 24 along this interface.

As can furthermore be seen in FIGS. 2 and 3, the annular base portion 27a of the internally geared hub cover 26 is preferably provided with an outer surface at its outer peripheral end that extends at a slight angle. The outer peripheral end of the annular base portion 27a extends well beyond the annular outer rim portion 27b of the internally geared hub cover 26 to form a seat for receiving the outer annular seal 29 to keep it in place when it is wedged against the inner wall of the annular groove 38.

The annular housing 27 of the internally geared hub cover 26 is preferably further provided with a circumferential flange 27e that extends axially from the annular base portion 27a. This circumferential flange 27e is coaxially arranged about the driving member opening 27c such that the circumferential flange 27e forms a seat that receives the inner annular seal 28 and acts as a torque barrier to the inner annular seal 28. In other words, the circumferential flange 27e keeps the inner annular seal 28 retained on the edge of the driving member opening 27c and prevents the inner annular seal 28 from flexing away from its contact surface on the driving member 22 under pressure. Thus, the circumferential flange 27e maintains the close contact between the inner annular seal 28 and the contact surface on the driving member 22 required for effective sealing. In addition, the annular housing 27 is further provided with an inner projecting part 27f extending radially from the annular base portion 27a into a recess 28c of the inner annular seal member 28. The inner annular seal member 28 is thus disposed on opposite axial sides of the inner projecting part 27f.

As can be seen in FIGS. 2 and 3, the inner annular seal 28 is a two piece contraction that is provided with a resilient seal element 28a and a rigid reinforcement element 28b. The reinforcement element 28b is at least partially embedded in the resilient seal element 28a and more preferably completely embedded in the resilient seal element 28a. Preferably, the reinforcement element 28b is made of steel, but could be made of any other suitable rigid material with appropriate material characteristics. Preferably, the resilient seal element 28a is made of an elasotmeric or plastic sealing material, but could be made of any other suitable sealing material with appropriate material characteristics. Preferably, the internally geared hub cover 26 is made of a more rigid material than the seal element 28a and the outer seal 29.

Figure 4:
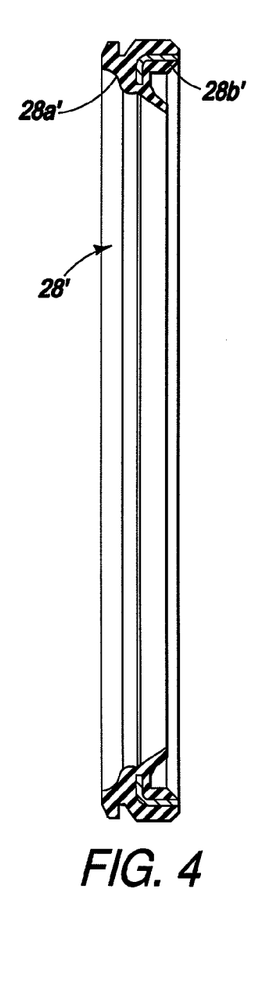
FIG. 4 is a cross sectional view of the inner annular seal retained illustrated in FIG. 2 that is on retained the base portion of the central opening in the internally geared hub cover.
Figure 5:
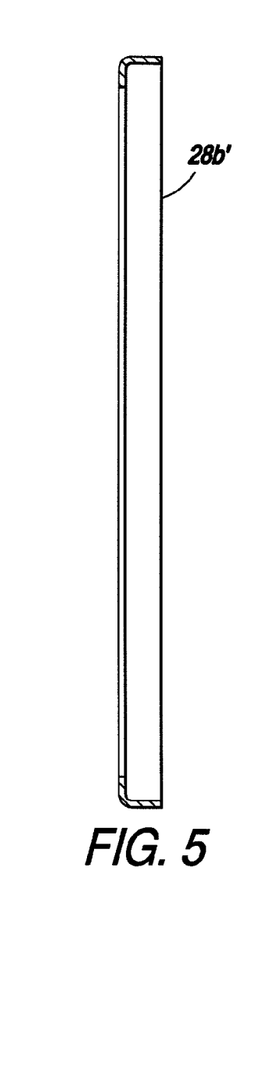
FIG. 5 is a cross sectional view of the annular reinforcement member as contained in the seal illustrated in FIG. 4.

In FIG. 4, an alternate version of an inner seal 28' is shown in more detail again and in a full cross section. As can be taken from FIG. 4, a version of the inner seal 28 is shown, in which a reinforcement element 28b', which is shown alone in FIG. 5, is fully embedded into a seal element 28a'. The reinforcement elements 28b and 28b' are identical, while the only difference between the seal element 28 and 28a' is that the element 28 does not completely cover the reinforcement element 28b as in the case of the inner seal 28'. Thus, the version as shown in FIGS. 2 and 3, has the reinforcement element 28b located at the inner surface of the inner contour of the seal 28. Embedding the reinforcement element 28b fully into the material can be advantageous, as it is not exposed to the environment, and thus protected from fatigue due to oxidation, heat, dirt, etc. so that the rigidity, and thus the supporting function of the reinforcement element can be maintained over a long time and regardless of the conditions of use.

Figures 7, 8:
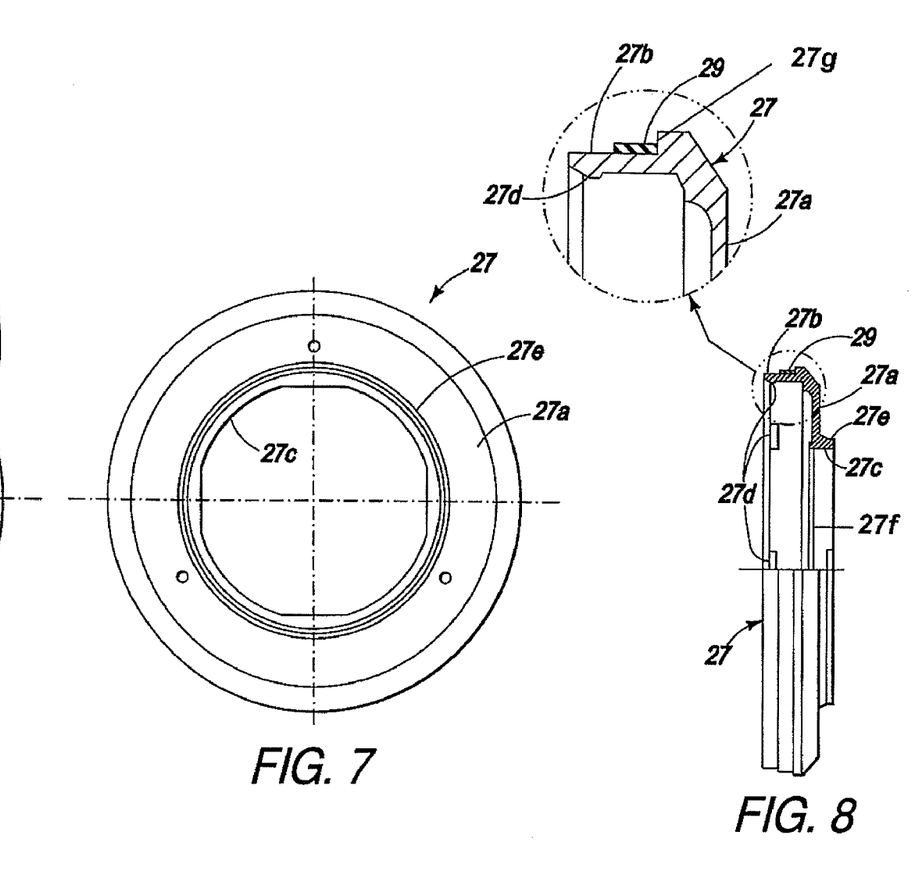
FIG. 7 is a partial cross sectional view of the internally geared hub cover illustrated in FIGS. 2 and 6 without the inner seal.
FIG. 8 is an outside elevational view of the internally geared hub cover illustrated in FIGS. 2, 6 and 7 without the inner seal.

FIGS. 6, 7 and 8 show the internally geared hub cover 26 in an inside elevational view, a partial cross sectional view, and an outside elevational view, together with the outer seal 29 applied to the circumference of the housing of the internally geared hub cover 26. What can be taken in particular from FIG. 6, is the distribution and form of the protuberances 27d on the inner surface of the annular outer rim portion 27b of the housing 27, projecting only slightly radially to the inside of the inner surface of the annular outer rim portion 27b. FIG. 8 clearly shows that the annular outer rim portion 27b has an outer surface that constitutes a seat for the outer seal 29 which is disposed on this outer surface or seat. This seat has a radial abutment 27g at a first end of the outer surface to restrict axial movement of the outer seal 29 relative to the housing 27, as seen in FIG. 8. The outer surface of the seat has a second free end with a diameter that is smaller than an outer diameter of the outer seal 29. As such, the outer seal 29 is installable in an axial direction from the second free end to the first end.

Figure 9:
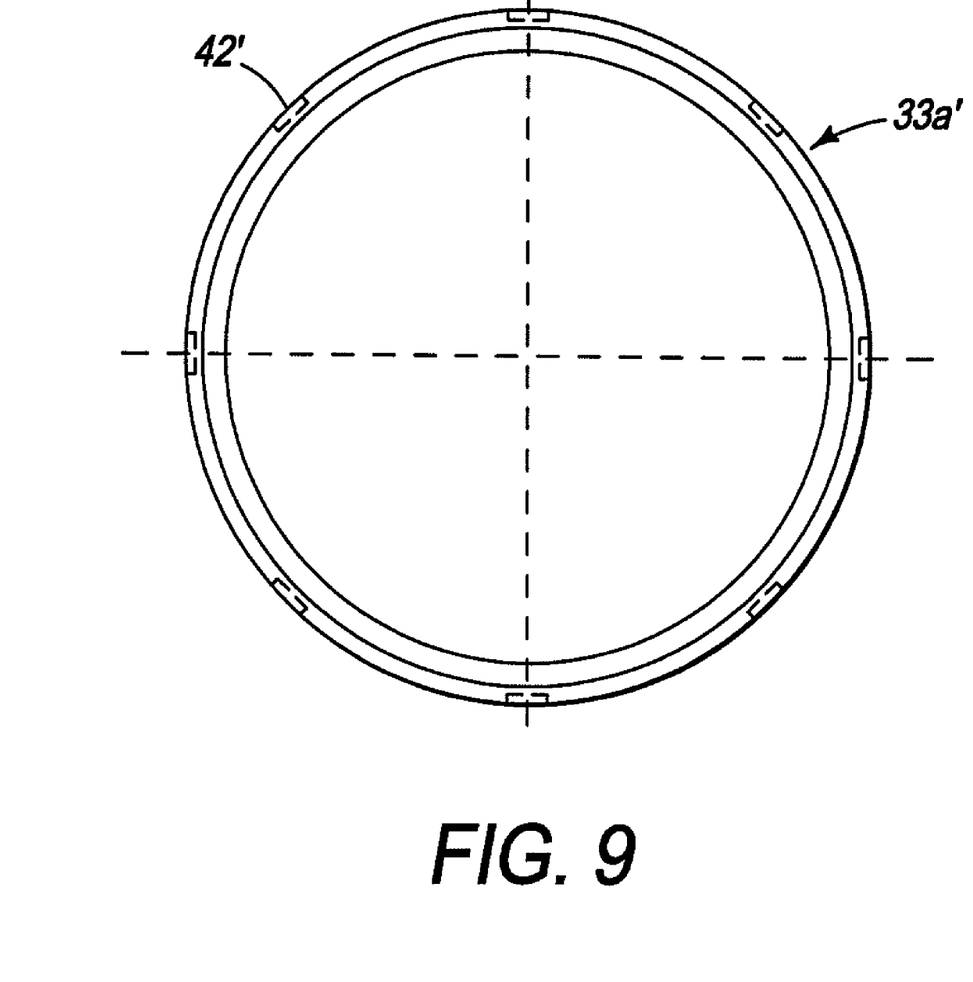
FIG. 9 is an outside elevational view of the right outer bearing cup of the internally geared hub cover illustrated in FIGS. 2 and 3.

FIG. 9 shows alternate outer bearing cup 33a' for use with the internally geared hub cover 26. In the alternate outer bearing cup 33a', a cover mating structure is provided that includes a distinct and circumferentially distributed notches 42' corresponding with the radially projecting protuberances 27d on the internally geared bicycle hub cover 26. Thus, the alternate outer bearing cup 33a' only differs from the outer bearing cup 33a in that the annular groove or recess 42 is configured as a plurality of distinct notches 42'.

Considering all of the above, the internally geared hub cover 26 for a bicycle hub transmission can be provided that effectively prohibits contaminants from entering the inside of the hub transmission, so that a reliable function of the hub transmission can be maintained over a long period of time. At the same time, the cover according to the invention is easy to apply and remove.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A cover for an internally geared bicycle hub comprising:
a generally cup-shaped annular housing including a base portion defining a centrally located driving member opening and an outer rim portion located radially outward of the base portion with at least two radially projecting protuberances configured and arranged to engage a cover mating structure on an internally geared bicycle hub;
an inner annular seal disposed on the base portion of the annular housing about the driving member opening, the inner annular seal having a resilient seal element and a rigid reinforcement element; and
an outer annular seal disposed on the outer rim portion of the annular housing and facing in a substantially opposite radial direction from the radially projecting protuberances,
the annular housing further including an inner projecting part extending radially from the base portion into a recess of the inner annular seal such that the inner annular seal is disposed on opposite axial sides of the inner projecting part, and a circumferential flange extending axially from the base portion and coaxially arranged about the driving member opening such that the circumferential flange forms a seat for the inner annular seal and acts as a torque barrier to the inner annular seal, and
the rigid reinforcement element being located on a first axial side of the inner projecting part and the outer annular seal being located on a second axial side of the inner projecting part which is opposite the first axial side.

2. The cover according to claim 1, wherein
the radially projecting protuberances project in an inward radial direction, and
the outer annular seal is disposed on an outer facing circumference surface of the outer rim portion of the annular housing.

3. The cover according to claim 2, wherein
the outer rim portion of the annular housing includes a seat configured and arranged to receive the outer annular seal and restrict axial movement of the outer annular seal relative to the annular housing.

4. The cover according to claim 1, wherein
the outer rim portion of the annular housing includes a seat configured and arranged to receive the outer annular seal and restrict axial movement of the outer annular seal relative to the annular housing.

5. The cover according to claim 1, wherein
the reinforcement element is completely embedded in the resilient element of the inner annular seal.

6. The cover according to claim 5, wherein
the reinforcement element of the inner annular seal includes an annular flange part and an outer circumferential wall part extending perpendicularly to the annular flange part.

7. The cover according to claim 1, wherein
the reinforcement element of the inner annular seal includes an annular flange part and an outer circumferential wall part extending perpendicularly to the annular flange part.

8. The cover according to claim 1, wherein
the outer rim portion of the annular housing includes a circumferential wall with the radially projecting protuberances circumferential spaced apart on one of an inner circumferential surface and an outer circumferential surface.

9. An internally geared bicycle hub comprising:
a hub axle;
a hub shell coaxially mounted on the hub axle to rotate relative to the hub axle;
a transmission mechanism coaxially mounted on the hub axle and operatively coupled to selectively transmit a rotational drive force to the hub shell through a plurality of transmission paths,
at least one of the transmission mechanism and the hub shell being configured and arranged to form an annular wedging groove with one of the transmission mechanism and the hub shell having a cover mating structure disposed in the annular wedging groove; and
an internally geared bicycle hub cover comprising a generally cup-shaped annular housing including a base portion defining a centrally located driving member opening and an outer rim portion located radially outward of the base portion with at least two radially projecting protuberances engaging the cover mating structure on the one of the transmission mechanism and the hub shell;

an inner annular seal disposed on the base portion of the annular housing about the driving member opening to seal the space between a portion of the transmission mechanism projecting through the driving member opening, the inner annular seal having a resilient seal element and a rigid reinforcement element; and an outer annular seal disposed between the outer rim portion of the annular housing and the one of the transmission mechanism and the hub shell such that the outer annular seal faces in a substantially opposite radial direction from the radially projecting protuberances, the outer rim portion of the annular housing includes a seat having an outer surface with the outer annular seal disposed on the outer surface and a radial abutment disposed at a first end of the outer surface to restrict axial movement of the outer annular seal relative to the annular housing, the outer surface has a second free end with a diameter that is smaller than an outer diameter of the outer annular seal such that the outer seal is installable in an axial direction from the second free end to the first end, the annular housing further including an inner projecting part extending radially from the base portion into a recess of the inner annular seal such that the inner annular seal is disposed on opposite axial sides of the inner projecting part, and a circumferential flange extending axially from the base portion and coaxially arranged about the driving member opening such that the circumferential flange forms a seat for the inner annular seal and acts as a torque barrier to the inner annular seal, and the rigid reinforcement element being located on a first axial side of the inner projecting part and the outer annular seal being located on a second axial side of the inner projecting part which is opposite the first axial side.

10. The internally geared bicycle hub according to claim 9, wherein
the cover mating structure includes a substantially radially extending circumferential hub coupling groove communicating with the annular wedging groove.

11. The internally geared bicycle hub according to claim 9, wherein
the cover mating structure includes a distinct and circumferentially distributed notches corresponding with the radially projecting protuberances on the internally geared bicycle hub cover.

12. The internally geared bicycle hub according to claim 9, wherein
the outer rim portion includes a circumferential wall that has an inner contour at least partially corresponding with a contact surface of the one of the transmission mechanism and the hub shell that has the cover mating structure.

13. The internally geared bicycle hub according to claim 9, wherein
the radially projecting protuberances project in an inward radial direction, and
the outer annular seal is disposed on an outer facing circumference surface of the outer rim portion of the annular housing.

14. The internally geared bicycle hub according to claim 9, wherein
the reinforcement element is completely embedded in the resilient element of the inner annular seal.

15. The internally geared bicycle hub according to claim 9, wherein
the reinforcement element of the inner annular seal includes an annular flange part and an outer circumferential wall part extending perpendicularly to the annular flange part.

16. The internally geared bicycle hub according to claim 9, wherein
the annular housing further includes a circumferential flange extending axially from the base portion and coaxially arranged about the driving member opening such that the circumferential flange forms a seat that receives the inner annular seal and acts as a torque barrier to the inner annular seal.

* * * * *